J. S. BANTA & A. T. WEAVER.
WIRE JOINING MECHANISM.
APPLICATION FILED JAN. 24, 1914.
1,109,388.
Patented Sept. 1, 1914.
2 SHEETS—SHEET 1.
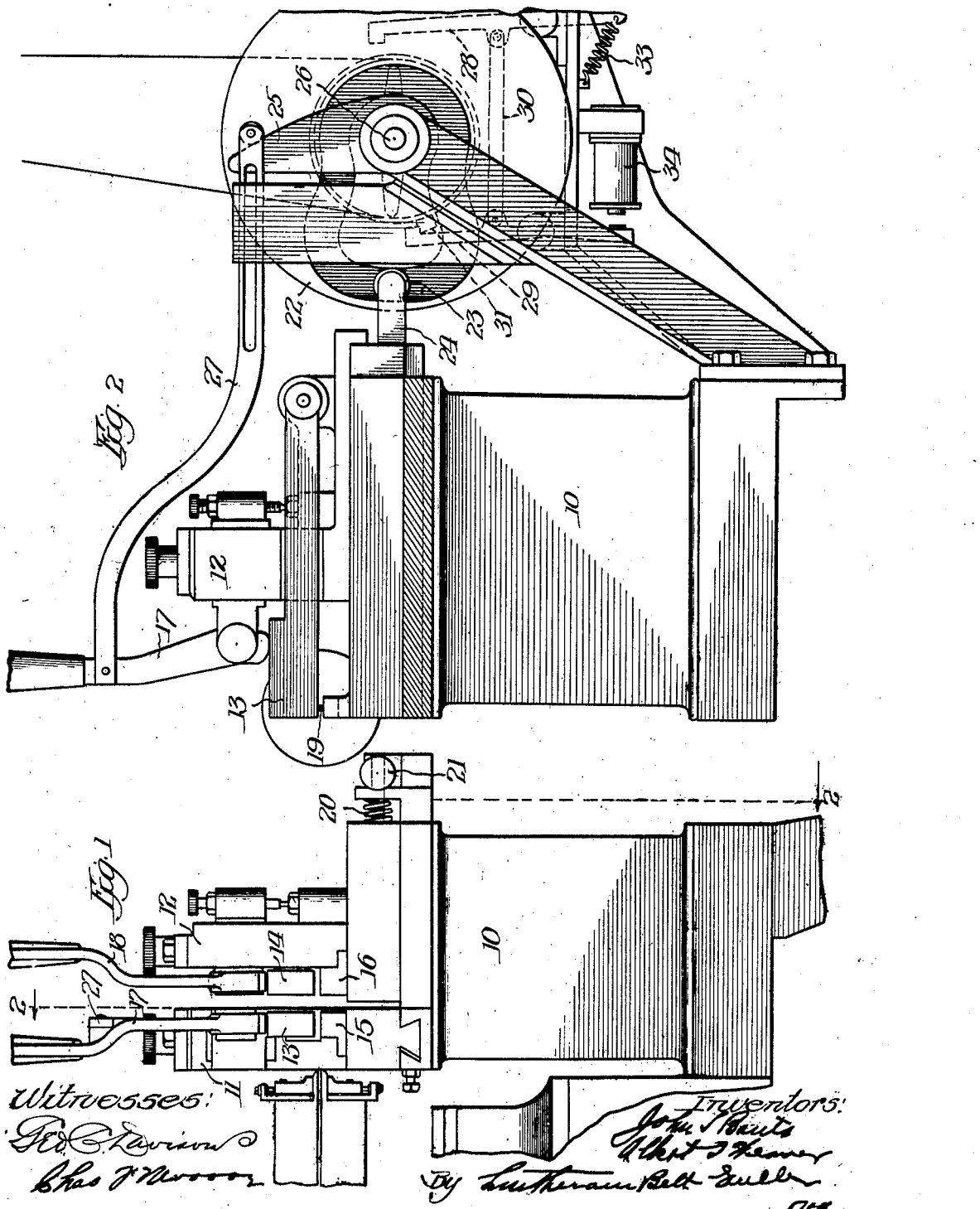

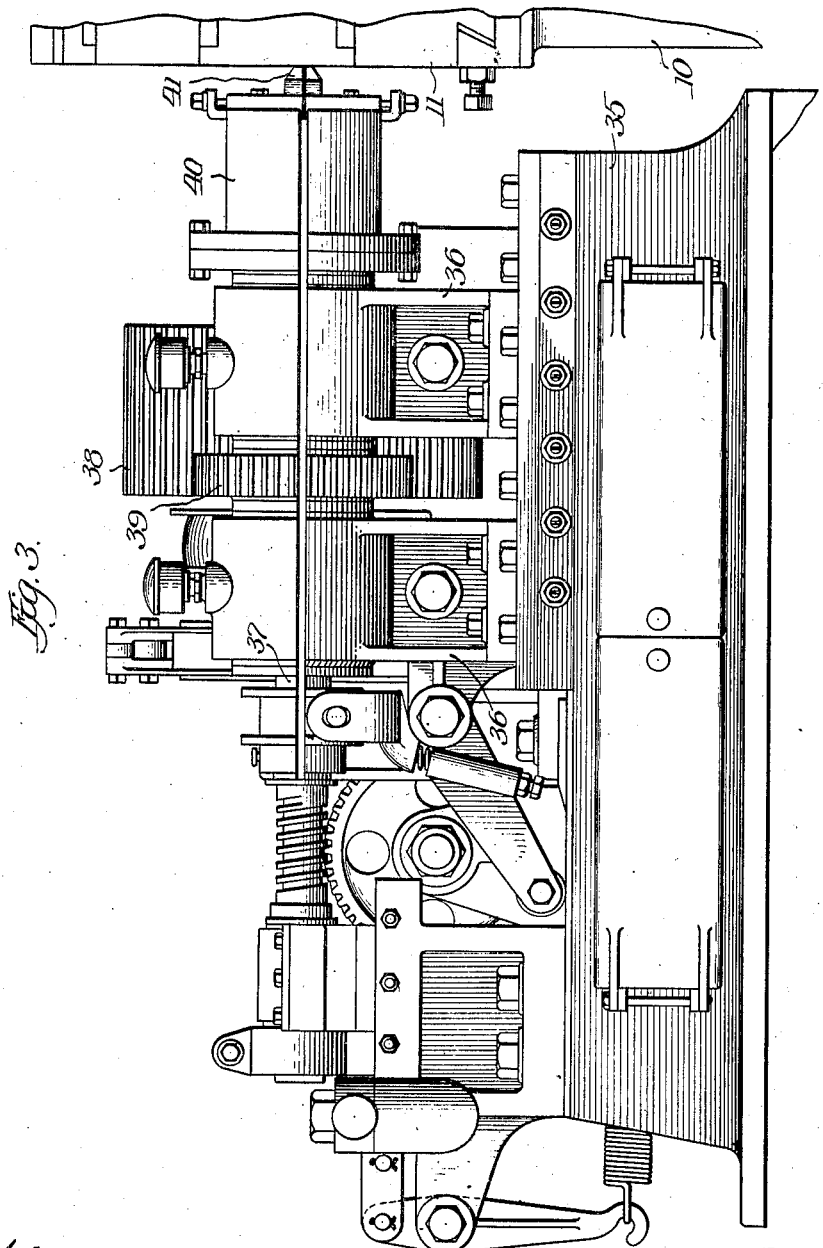

UNITED STATES PATENT OFFICE.

JOHN S. BANTA, OF WAUKEGAN, AND ALBERT T. WEAVER, OF JOLIET, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

WIRE-JOINING MECHANISM.

1,109,388. Specification of Letters Patent. Patented Sept. 1, 1914.

Original application filed August 23, 1912, Serial No. 716,606. Divided and this application filed January 24, 1914. Serial No. 814,083.

*To all whom it may concern:*

Be it known that we, JOHN S. BANTA and ALBERT T. WEAVER, citizens of the United States, and residing at Waukegan, in the county of Lake, State of Illinois, and Joliet, in the county of Will, State of Illinois, respectively, have invented certain new and useful Improvements in Wire-Joining Mechanism, of which the following is a specification.

Our invention relates to mechanism for joining the ends of wire or wire rods and has particular reference to a novel combination of an electric welding device with a machine for removing the resulting bur from the wire at the point of weld. Mechanism by which this novel result is secured was first disclosed in our copending application Serial No. 716,606, filed Aug. 23, 1912, the matter contained in this application being a division from the said copending application.

The practice of joining metallic articles by electric welding is well established. In such practice it is common to clamp the two parts to be welded, then pass an electric current through the contacting ends, causing the metal to be fused. At the same time one of the clamping jaws is advanced toward the other thus upsetting and causing an intimate union of the metal at the contacting ends of the article; in effect, the two ends are caused to flow or fuse and be joined as one. However, an amount of metal equal in extent to the movement of the parts toward each other is displaced and flows outside of the original contour of the article, thus forming what is usually called a bur; that is, a surplus of metal of irregular shape, which metal must be removed by turning or grinding if the article is to have a regular surface.

In the illustrations we have shown the device as applied to the wire working industry. In many cases two ends of wire are united and the resultant bur must be removed by some means before the article can be further treated or used. This entails a large amount of labor and has heretofore precluded the employment of an electric welding device in connection with wires to be passed through the galvanizing process or for nail or fabric machines.

The herein described machine is adapted for use in connection with an electric welding machine of any well known type. A welding machine is shown in the drawings and our automatic bur removing machine is so arranged that the operations of the two units, that is, the welding and the bur removing devices, are synchronous, the weld is formed and immediately thereafter the bur removing device advances and properly shapes the article. During this operation the otherwise free end of the wire is held in one of the welding machine clamps.

The objects of our invention may be stated to be as follows: First, to provide a machine which shall be almost entirely automatic in character, thus eliminating skilled labor in its operation; second, to provide a machine which shall be capable of wide adjustment to accommodate different gages of wire; also to accommodate itself to inequalities such as may be present in the gage of the wire; third, to combine with such a machine a semi-automatic welding device, by means of which the ends of the articles may be united, the resultant bur being thereafter removed.

A particular advantage results in the combination of an electric welding device with an automatic bur removing device, the parts being connected for synchronous operation. In such a combination the operator is only required to locate the unjoined ends of wire within the welding machine, then start the mechanism in operation. The two wires are thereafter automatically welded and the resultant bur removed, the operation requiring but a very short period of time.

The invention will be more readily understood by reference to the accompanying drawings wherein—

Figure 1 is a front elevation of an electric welding device associated with a portion of the bur removing device, the parts being arranged for synchronous operation; Fig. 2 is a section on the line 2—2 of Fig. 1; and Fig. 3 is a side elevation of the bur removing device which automatically removes the bur from the wire after the welding action takes place.

Referring more particularly to the drawings it will be seen that we provide a welding device which may consist of a base 10 having standards or brackets 11, 12, superposed thereon, these brackets supporting and guiding upper jaws 13, 14, which jaws cooperate with lower stationary jaws 15, 16. The upper jaws are adapted to be swung downward into clamping relation by means of the manually operable levers 17, 18, a wire being shown at 19 in place between the jaws. The bracket 11 is mounted in a dovetailed groove and is movable transversely of the axis of the wire into and out of operative relation to the wire by means of a cam 22, which cam coöperates with an anti-friction roll 23 carried by a link 24 secured to the bracket 11. This cam member, as will be later described, completes its cycle in two movements, that is each movement consists of a half revolution whereby the bracket carrying the clamps 13, 15 is advanced during one portion of the cycle and retracted during the other portion. This is so arranged in order to permit the advance of the bur removing tool into the plane theretofore occupied by the clamps 13, 15. However, the bracket 12 and its associated parts are adapted for movement longitudinally of the wire as shown in Fig. 1, that is the base portion is acted upon by a coil spring 20 which normally forces the parts into the position of Fig. 1. However, when a wire is to be joined the one end is clamped in between the jaws 13, 15 and the other end clamped between the jaws 14, 16 with the bracket moved to the right against the spring 20 by means of the handle 21. As the ends of the wire are fused by electrical contact the spring forces the ends of the wire into intimate engagement and displaces a portion of the metal sidewise. This forms a bur which is to be removed by the bur removing device later to be described.

In order that the mechanism may be automatic in character to a certain extent we provide means for releasing the clamps 13, 15 after the completion of the weld in order to permit the retraction of the said jaws. This mechanism consists in a lever or cam 25 carried on the shaft 26 with the cam 22 movable therewith. This cam 25 coöperates with a lever 27, the other end of which lever connects with the handle 17 actuating the clamps 13, 15. As the cam or lever 25 rotates from the position of Fig. 2 it will be seen that the lever 17 is retracted and the clamp 13 allowed to raise. After this action is completed the cam 25 becomes disengaged from the link 27 and completes its revolution out of engagement therewith.

As a means for causing the proper timed rotation of the cams 22, 25 we provide a magnetic trip, as shown in Fig. 2. In this figure it will be seen that we have provided two pivoted stop members 28, 29 connected by means of the link 30, the hooks on the ends of these members are adapted to alternately engage with a stop 31 on the cam member 22. The stop members 28, 29 are held in one position by means of the coiled spring 33 and shifted against the force of the spring by means of a magnet 34. This magnet is actuated by the closing of a circuit either manually or automatically indicating a completion of the welding operation. In Fig. 2 the magnet 34 has been deenergized and has disengaged the stop 31 from the hook on the end of the lever 28 permitting the turning of the disk until stopped by the hook on the lever 29. It will be understood that after the welding and bur removing operations the clamps 14, 16 are disengaged manually.

The bur removing device as shown in Fig. 3 need not be herein described in detail for the reason that its specific construction forms no part of the present invention. It may be stated, however, that such machine includes a base 35 on which are secured ways within which a pair of brackets or bearings 36 are adapted to reciprocate. Carried by the bearings 36 is a transverse shaft 37 rotatable by means of the gear 38 and pinion 39 and bodily movable with said bearings. This shaft carries a head 40 within which are mounted bur removing or milling tools 41 by means of which irregularities or burs are removed from the welded material.

In operation a wire is fed through the burr removing device, its end extending past the jaws 13, 15 and clamped therebetween. A wire to be joined thereto is then clamped between the jaws 14, 16 with the head or bracket retracted against the spring 20. Current is then passed through the joined ends of the wires fusing the same and displacing a certain amount of the metal sidewise due to the shifting of the bracket 12 sidewise under the force of the spring 20. As the current is shut off the magnet 34 is energized, starting the operation of the cam disk 22 and cam 25 which results in the releasing of the wire from the clamps 13, 15 and the retraction of the clamp holding member 11. At the same time the bur removing machine is started into operation and the head advances into the plane formerly occupied by the clamps 13, 15, and, due to its rotation, removes the bur or irregularities from the surface of the wire. After the bur removing head has been retracted the wire is manually released from the clamp 14, 16, when the operation is complete.

We claim:

1. In a device of the class described, the combination of a welding device, a bur removing tool arranged for synchronous operation with said welding device, and means for simultaneously advancing and rotating said tool over the work previously acted upon by said welding device, substantially as described.

2. A welding and bur removing device, comprising in combination, clamping jaws arranged to secure the work during the welding operation, a bur removing tool, means for retracting one set of said clamping jaws to permit the operation of the bur removing tool, and means coöperating with the other set of jaws arranged to rigidly clamp the work during the operation of the bur removing device, substantially as described.

3. In a device of the class described, the combination of a welding apparatus including means for clamping two ends of the material to be welded, means for automatically advancing one set of clamping means toward the other during the welding operation whereby metal is displaced outside of the contour of the material acted upon, and a bur removing tool connected for synchronous operation with said welding device, said bur removing tool being rotatable and adapted for bodily advancement to act upon the welded joint while said joint is held in the position in which it was welded, substantially as described.

4. In a device of the class described, the combination of welding apparatus including two pairs of clamping jaws, means for moving one set of clamping jaws toward the other during the welding operation, means for retracting one set of clamping jaws and releasing the welded material therefrom, and bur removing means adapted to advance and act upon the welded material in the plane of the retracted jaws, substantially as described.

In witness whereof we have hereunto set our names in the presence of two subscribing witnesses.

JOHN S. BANTA.
ALBERT T. WEAVER.

Witnesses for John S. Banta:
O. R. PUTNAM,
C. F. BLACKMER.

Witnesses for Albert T. Weaver:
JAMES E. SIME,
CHARLES H. SCHELTER.